United States Patent

Hulteen

[15] 3,642,237
[45] Feb. 15, 1972

[54] SPIRAL REEFED VARIABLE DRAG PARACHUTE

[72] Inventor: Stanley C. Hulteen, Minnehaha, S. Dak.

[73] Assignee: The United States of America as represented by the Secretary of the Army

[22] Filed: May 14, 1970

[21] Appl. No.: 37,076

[52] U.S. Cl. .................................................. 244/152
[51] Int. Cl. .................................................. B64d 17/34
[58] Field of Search .......................... 244/152, 145, 142

[56] References Cited

UNITED STATES PATENTS

| | | | |
|---|---|---|---|
| 2,384,127 | 9/1945 | Nailer | 244/152 |
| 2,626,117 | 12/1953 | Heinrich | 244/152 |
| 3,278,143 | 10/1966 | Engel, Jr. | 244/150 |

FOREIGN PATENTS OR APPLICATIONS

| | | | |
|---|---|---|---|
| 912,299 | 12/1952 | Great Britain | 244/152 |

*Primary Examiner*—Milton Buchler
*Assistant Examiner*—Carl A. Rutledge
*Attorney*—Edward J. Kelly, Herbert Berl and Jesse J. Smith, Jr.

[57] ABSTRACT

This invention relates to a parachute having reefing lines formed about the body or canopy of the parachute in a spiral configuration in such a manner as to control the opening shock and rate of descent of such parachute. The spiral reefing of the parachute effectively increases or decreases the canopy area thereby controlling the aerodynamic drag of the parachute.

20 Claims, 4 Drawing Figures

SPIRAL REEFED VARIABLE DRAG PARACHUTE

BACKGROUND AND SUMMARY OF THE INVENTION

Conventional parachutes have been known and used for years in permitting atmospheric descent of men and equipment of both military and civilian users. One such use has been in the field of meteorology where a rocket carries aloft a meteorological sensing and transmitting means that subsequently descends and is tracked on radar thereby enabling a more accurate measure of the velocity and direction of the winds aloft, temperature, humidity, pressure or altitude, etc.

It is desireable to control the rate of descent of such a parachute so that the information obtained from the sensing means will be within the accuracy desired. Without some means to control the rate of descent, the parachute and sensing means might tend to loiter at various altitudes because of varying winds, density, etc., or fall at so high a rate, particularly at extremely high altitudes, that the response rate of the meteorological sensors would be too slow to provide representative data at the altitude where measured.

This invention relates to the broad field of parachute control devices and more specifically parachutes having means to control opening shock and rate of descent. The means to control opening shock and control the rate of descent includes reefing lines placed about the canopy of the parachute in a spiral configuration and in such a manner that the canopy area projected normal to the relative wind is varied thereby controlling the aerodynamic drag of the parachute and hence its rate of descent.

Prior parachute deployment practices have been confined to reefing the mouth of the parachute so as to delay the canopy air fill time and thereby reduce the opening shock. The effect of this method is limited and, where high ejection velocities are present, opening shock loads have been held within limits by deploying in succession progressively larger parachutes.

In contrast to the aforementioned step function, the spiraled reefed variable drag parachute herein disclosed can be controlled so as to progressively present a larger projected drag area as the canopy shock loading decays. Shock, deceleration, required parachute strength, weight, packing volume, and deceleration time conditions are thereby optimized.

In addition to optimizing deployment conditions the use of the spiraled reefing concept can be utilized to regulate the canopy drag area as the parachute descends to correspond to the increase in air density. In such case an essentially constant descent rate over a wide altitude regime is attainable. Variations of the descent velocity profile can be performed depending on what type of control mechanism is used. The only effective prior practice in achieving substantial variations of parachute descent velocity have been to release and/or deploy in succession additional parachutes at intervals during descent in much the same manner as that previously used to reduce opening shock. At best this practice has been a step function incurring much redundant packing volume and parachute expense.

Various other means to control the rate of descent and opening shock have been employed with moderate success; such devices including parachutes with blowout panels, multiple parachutes or drogue chutes, variable opening slots in the canopy, and the use of multiple and/or concentric canopies. Such parachutes often produce undesireable flutter and do not perform as well as the parachute more particularly described below.

BRIEF DESCRIPTION OF THE DRAWINGS

The exact nature of this invention will be readily apparent from consideration of the following description relating to the annexed drawings in which.

DESCRIPTION OF THE PREFERRED EMBODIMENT

Figure 1:
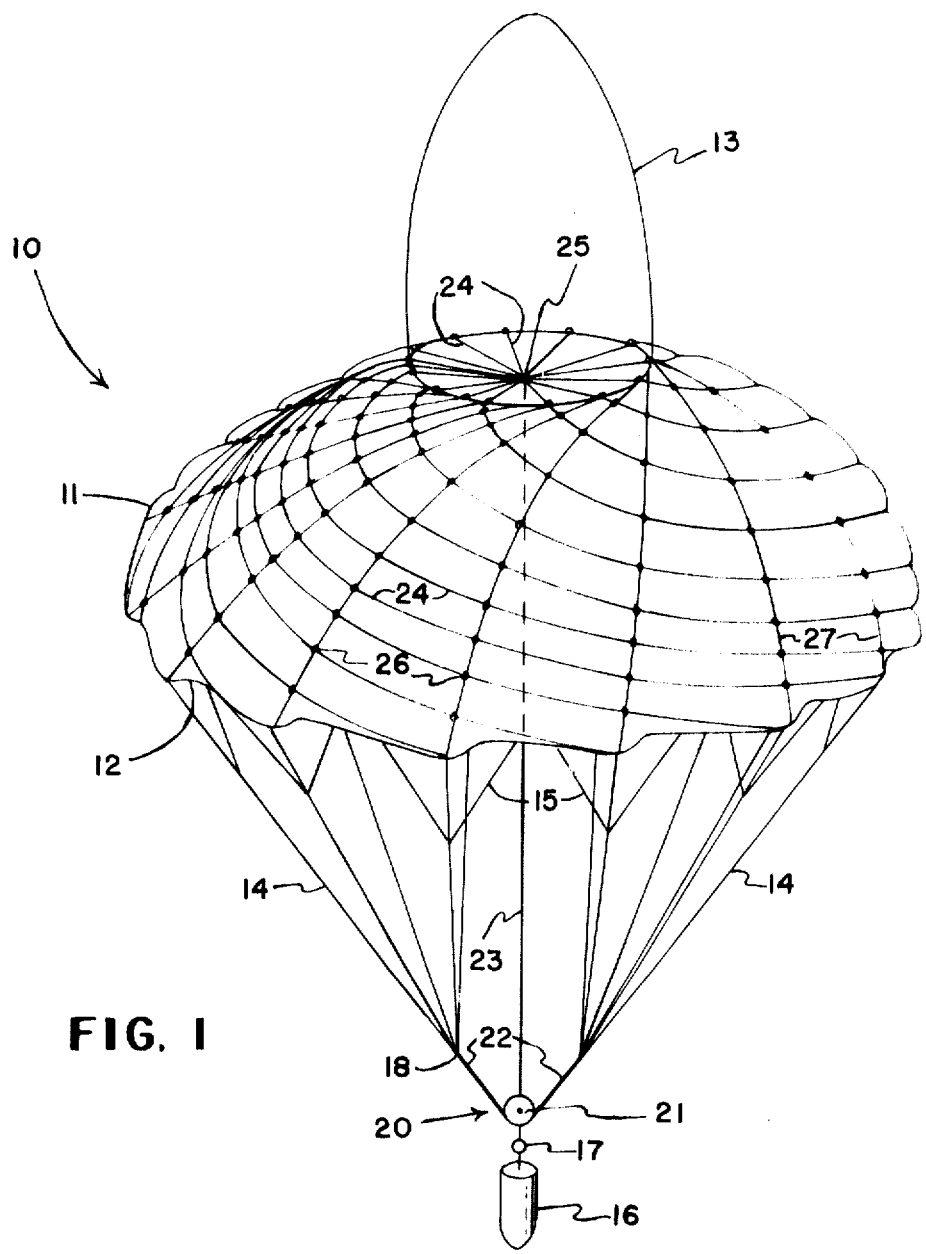
FIG. 1 shows a perspective view of the variable drag parachute of the instant invention with a payload attached.

Referring now to the drawings, wherein like reference characters designate like or corresponding parts throughout the several views. There is shown in FIG. 1 a perspective view of the variable drag parachute 10 having a canopy 11. The lower portion of canopy 11 has a skirt 12 while the upper portion of canopy 11 has a transparent ram air inflatable radar reflector 13. Although reflector 13 forms no part of the present invention, per se, it is shown here as the parachute has actually been constructed and tested. Suspended from skirt 12 by means of shroud lines 14 (some of which are undesignated in FIG. 1 for purposes of clarity in viewing the Figure) is a payload 16. Payload 16 may be any object, including men or equipment, that is desireable to be lowered through the atmosphere. Adjacent sections of canopy 11 are connected to shroud lines 14 by means of short auxiliary shroud lines 15 thereby eliminating substantial amounts of shroud line.

Payload 16 is connected to control section 20 by means of swivel 17. Control section 20 is comprised of a programmed spool 21, spring steel control section risers 22, and main control line 23. Shroud lines 14 join spring steel control section risers 22 at control confluence points 18. Main control line 23 is connected to spiral reefing lines 24 at apex confluence point 25. Reefing lines 24 are passed over canopy 11 through grommets 26, shown as dots in FIG. 1, and are secured to canopy 11 at the skirt 12. Grommets 26 are spaced on risers 27 that define adjacent sections or gores. Such risers 27 may be reinforced as desired so as to attach grommets 26.

Upon initial deployment of the parachute 10, control section 20 senses the velocity of the relative wind. Since the parachute 10 will initially be falling through the atmosphere or other fluid medium at a rate far in excess of the desired rate of descent or in excess of the velocity desired with respect to the relative wind, ram air inflatable radar reflector 13 will be inflated and the programmed spool 21 will exert opening shock tension on control line 23 that, in turn, will exert a high opening shock tension or force on reefing lines 24 thereby fully reefing canopy 11 near the lower periphery of transparent ram air inflatable radar reflector 13 and thereby decreasing opening shock. As the parachute 10 slows, more and more of the canopy is unreefed or deployed.

After deployment, the variable drag parachute 10 falls through the atmosphere or other fluid medium and control section 20 continues to sense the velocity of the relative wind. If the parachute is descending too slowly, i.e., the relative wind is too slow, programmed spool 21 increases the tension on control line 23 that, in turn, pulls on reefing lines 24 thereby reefing the canopy 11 about the area formed by the junction of canopy 11 and transparent ram air inflated radar reflector 13, as will be more fully explained with respect to FIGS. 2, 3, and 4. If the parachute is descending too rapidly, the operation is reversed. In effect the controlled reefing operation of the parachute 10 of the instant invention varies the parachute aerodynamic area, and thus its drag, in response to its sensed velocity relative to the wind or medium through which it travels.

Figure 2:
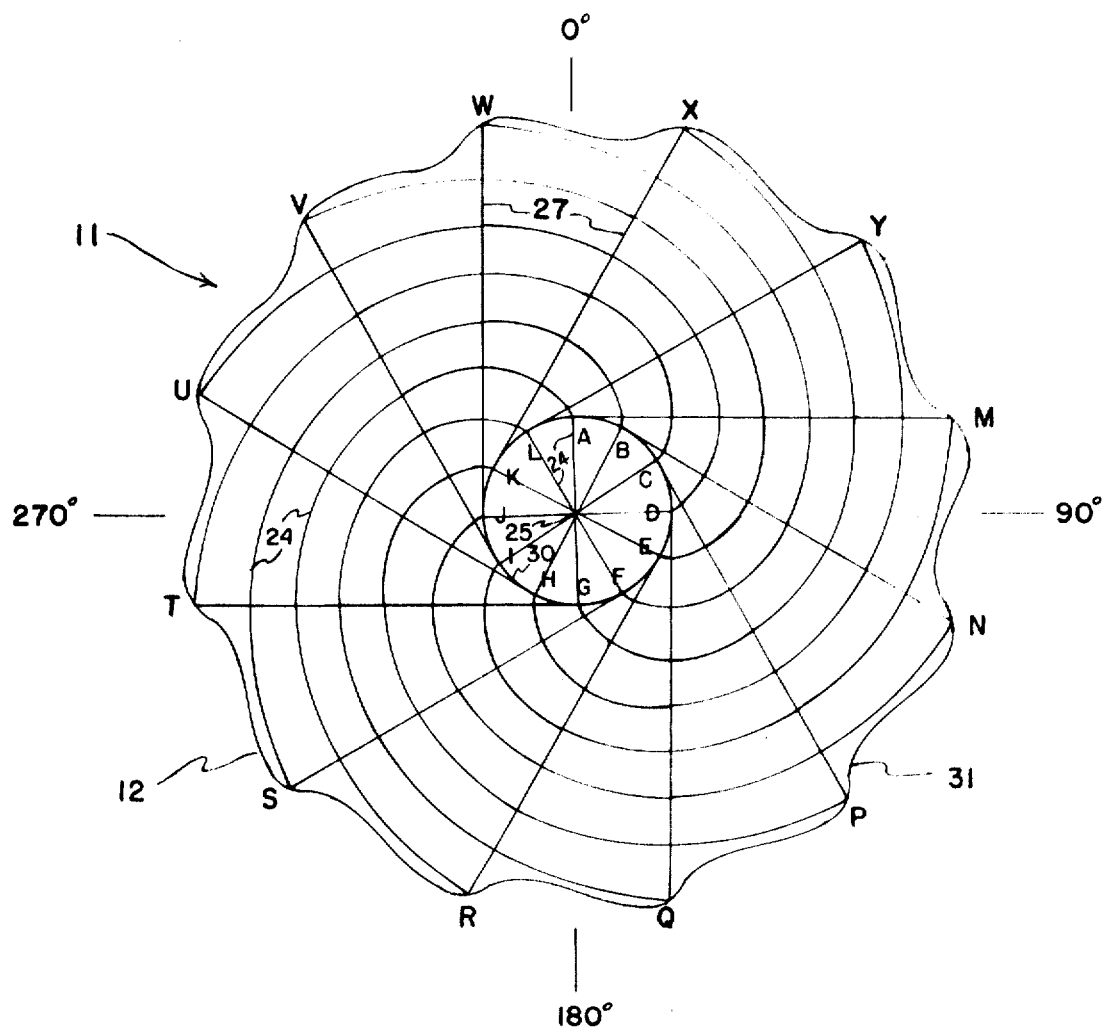
FIG. 2 shows a top view of the canopy of the parachute of FIG. 1 employing spiral reefing.

Referring now to FIG. 2, there is shown a top view of the canopy 11 having a skirt 12 and the apex hub 30 where spiral reefing lines 24 are joined at the apex confluence point 25. The reefing lines 24 sweep about the canopy 11 tracing the path of a spiral. Canopy risers 27 coming from the canopy apex 30 are always perpendicular to the intersecting reefing lines 24. Although not shown here in FIG. 2, grommets 26 are regularly spaced along risers 27 to allow reefing lines 24 to slide as easily therethrough as possible. It is noted that skirt 12 is generally circular in shape but has irregular-shaped cutouts or scallops 31 that tend to impart a rotational movement about an axis perpendicular to the plane of the drawing. Such a rotational movement gives the parachute 10 greater stability during descent and provides better radar reflection of the target mounted inside inflatable ram air reflector 13 as shown in FIG. 1.

As the reefing lines 24 are pulled by the main control line 23 (shown in FIG. 1) where it joins the reefing lines 24 at confluence point 25, the canopy 11 wraps around the apex hub 30. When the reefing action is complete, the canopy 11 is completely wrapped and gathered into a toroidal shape at the apex hub 30.

The reefing action may be visualized as follows (keeping in mind that reefing lines 24 are securely attached to the skirt 12 at points M-Y) as spiral-shaped line AR is pulled at point 25, the length of AR is shortened so that line AR essentially overlies spiral-shaped line LQ thereby moving point R toward point 25 a distance of AL. This effect continues as the reefing lines 24 are further pulled until the canopy 11 is completely reefed and wraps around the canopy apex hub 30. The spiraled reefing lines 24, therefore, act to uniformly decrease the radius of the canopy 11 thereby decreasing the aerodynamic drag as, for example, when the control section 20 senses that the parachute 10 is descending at too low a rate.

Figure 3:
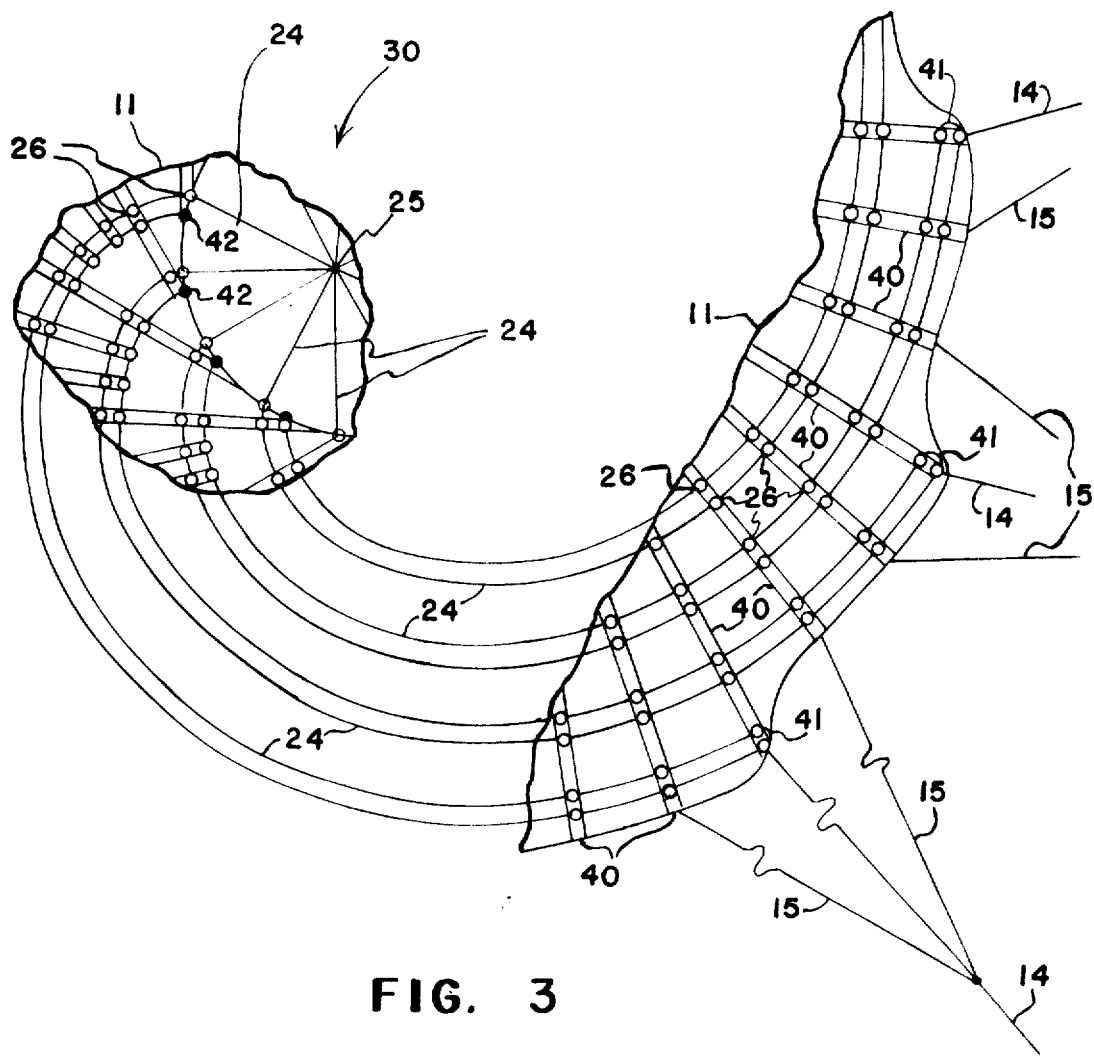
FIG. 3 shows a cutaway view of one reefing scheme of the instant invention.

Referring now to FIG. 3, there is shown a cutaway view of one reefing scheme of the instant invention. Partial sections of canopy 11 are shown with one section showing skirt 12 with the other section showing apex hub 30. Connected to skirt 12, there is shown shroud line 14 with auxiliary shroud lines 15. Reefing lines 24 emanate from apex confluence point 25 and enter grommets 26, shown symbolically as circles, are subsequently passed through successive grommets 26 to turnaround points 41 and back to apex hub 30 where they are secured to the canopy at points 42. The reefing lines 24 are connected to main control 23 (not shown here) at apex confluence point 25. Such an arrangement gives a mechanical advantage of 2:1 over the method disclosed above with respect to FIGS. 1 and 2 where the reefing lines were secured to skirt 12. Various webbing 40 is employed to reinforce the canopy 11 where the grommets are attached.

Figure 4:
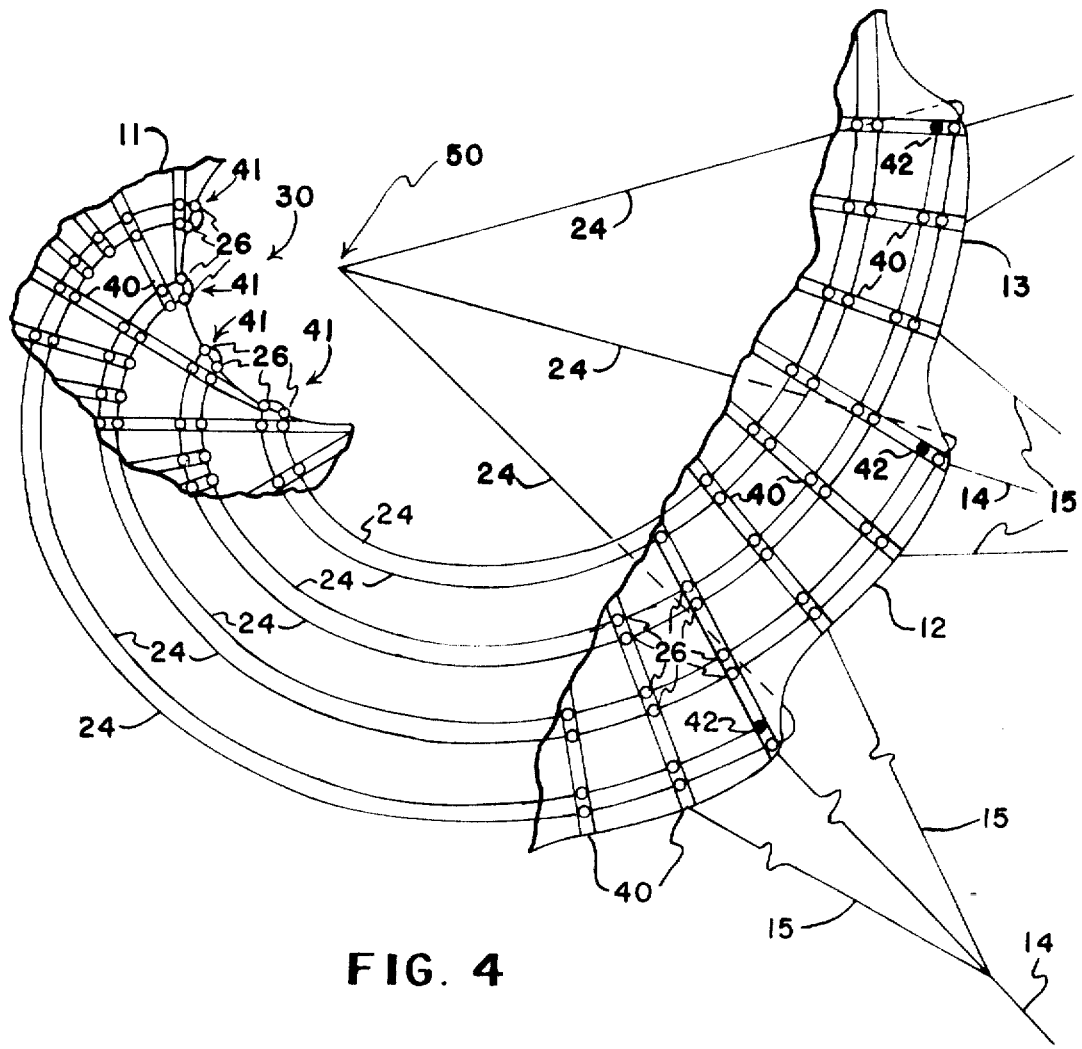
FIG. 4 shows a cutaway similar to FIG. 3 but illustrating an alternative method of connecting reefing lines.

Referring now to FIG. 4 there is shown a cutaway of canopy 11 similar to FIG. 3 but showing an alternative method of connecting reefing lines 24 at alternate confluence point 50 where main control line 23 attaches. The essential differences between the embodiments shown in FIGS. 3 and 4 is that in FIG. 4 turn-around points 41 are at the apex hub 30 and reefing lines 24 are secured at point 42 on the skirt 12 instead of as shown in FIG. 3. This arrangement, likewise, gives a 2:1 mechanical advantage over the method disclosed with respect to FIGS. 1 and 2. It is noted from FIG. 4 that the reefing lines 24 meet under canopy 11, essentially in the plane formed by and including the points along skirt 12.

In the parachute actually constructed, canopy 11 had an uninflated diameter of 104.0 inches while the diameter of radar reflector 13 and apex hub 30 was 24.0 inches, although other sizes might obviously be used by one skilled in the art. Canopy 11 may be constructed of nylon or other suitable material. To decrease the size of the folded parachute, canopy 11 has been fabricated from a plastic film. Grommet 26 and reefing line 24 friction must be maintained at a low value to insure reliable reefing. Descent rates of 3,000 feet/minute have been successfully achieved with a descent from approximately 90,000 feet taking roughly 30 minutes. Other altitudes and descent rates may be employed where desired using the teachings herein disclosed.

Although rockets have been employed as the principal means of placing the parachute in the atmosphere, other means may be employed including aircraft, satellites, balloons, etc. Reefing lines 24 have been shown as being placed on the outside of canopy 11 and it is expected that equally good results could be achieved by placing such reefing lines inside canopy 11. Likewise, reefing lines 24 (as shown in FIG. 1) might form an alternate confluence point 50 (as shown in FIG. 4) inside the canopy 11 thereby eliminating the apex confluence point 25 in FIG. 1. Reefing lines 24 would then be secured to apex hub 30, that is, the junction of canopy 11 and reflector 13 as shown in FIG. 1.

It should be understood, of course, that the foregoing disclosure relates to only preferred embodiments of the invention and that numerous modifications or alterations may be made therein without departing from the spirit and the scope of the invention as set forth in the appended claims.

What is claimed is:

1. A parachute comprising:
   a canopy;
   means for attaching a mass to said canopy;
   means attached to said canopy for reefing said canopy in a spiral manner, and;
   means connected to said canopy for controlling said reefing means.

2. A parachute according to claim 1, and further comprising that:
   said canopy is generally circular in shape, and;
   said reefing means comprises a plurality of lines positioned about said canopy in a spiral-shaped manner whereby the drag of said parachute is varied by actuating said reefing means.

3. A parachute according to claim 2, and further comprising that:
   said canopy having an outer periphery and a center section, and;
   said plurality of reefing lines are connected together at said center section and are secured to the periphery of said canopy.

4. The parachute according to claim 2, and further comprising that:
   said canopy having an outer periphery and a center section, and;
   said plurality of reefing lines are connected together and are secured to said canopy at said center section.

5. A parachute according to claim 2, and further comprising that:
   said canopy is generally circular in shape and is comprised of an outer periphery and a center section, and;
   said plurality of reefing lines are connected together at said center section and are secured to said canopy at said center section.

6. A parachute according to claim 2 and further comprising that:
   said canopy is generally circular in shape and is comprised of an outer periphery and a center section, and;
   said plurality of reefing lines are connected together at said periphery and are secured to said outer periphery.

7. A variable drag parachute comprising:
   a canopy having an apex hub and a skirt;
   shroud lines attached to said skirt;
   sensing means for detecting the relative velocity of said parachute, said sensing means being connected to said shroud lines, said sensing means including a programmed spool, and;
   reefing lines positioned about said canopy in a spiral configuration and connected to said programmed spool whereby said spool acts on said reefing lines in response to said sensing means thereby controlling the drag of said parachute.

8. A variable drag parachute according to claim 7, and further comprising that:
   said reefing lines are joined at said apex hub and are secured to the skirt of said canopy.

9. A variable drag parachute according to claim 7, and further comprising that:
   said reefing lines are joined at said skirt and are secured to said apex hub of said canopy.

10. A variable drag parachute according to claim 7, and further comprising that:
    said reefing lines are joined at said apex hub and are secured thereto.

11. A variable drag parachute according to claim 7, and further comprising that:
   said reefing lines are joined at said skirt and are secured thereto.

12. A variable drag parachute comprising:
   a canopy, said canopy having a circular-shaped concentric opening therein and a generally circular skirt defining the outer periphery of said canopy;
   shroud lines emanating from said skirt and being suspended from said skirt;
   control means connected to and supported by said shroud lines for sensing the descent of said parachute relative to the atmosphere through which said parachute descends and for producing a control signal when said parachute is descending at a rate other than a preselected rate;
   a mass connected to said control means;
   reefing lines positioned about said canopy in a spiral-shaped configuration, said reefing lines being joined at a junction, and;
   a control line connecting said reefing line junction and said control means whereby said control signal acts on said control line and said reefing lines to vary the drag of said canopy as the parachute descends through the atmosphere.

13. The variable drag parachute according to claim 12, and further comprising that:
   said reefing lines are joined at said concentric-shaped circular opening and are secured to said canopy at said skirt.

14. The variable drag parachute according to claim 12, and further comprising that:
   said reefing lines are joined at said circular-shaped concentric opening and are secured thereto.

15. The variable drag parachute according to claim 12, and further comprising that:
   said reefing lines are joined at said skirt and are secured to said circular-shaped concentric opening.

16. The variable drag parachute according to claim 12, and further comprising that:
   said reefing lines are joined at said skirt and are secure thereto.

17. The variable drag parachute according to claim 12, and further comprising:
   a ram air inflatable structure mounted on said circular-shaped concentric opening.

18. The variable drag parachute according to claim 12, and further comprising that:
   said canopy is comprised of an inside and an outside, and;
   said reefing lines are positioned about the inside of said canopy.

19. The variable drag parachute according to claim 12, and further comprising that:
   said canopy is comprised of an inside and an outside, and;
   said reefing lines are positioned about the outside of said canopy.

20. The variable drag parachute according to claim 17, and further comprising that:
   said generally circular-shaped skirt is formed with scallops therein to assure rotation of said canopy about its descent path thereby imparting greater stability and radar reflectivity to said structure.

* * * * *